United States Patent [19]
Sofue

[11] Patent Number: 6,147,947
[45] Date of Patent: Nov. 14, 2000

[54] OPTICAL DISK APPARATUS FOR ACCESSING OPTICAL DISKS WITH DIFFERENT SUBSTRATE THICKNESSES

[75] Inventor: Masaaki Sofue, Yokohama, Japan

[73] Assignee: Ricoh Co., Ltd., Yokohama, Japan

[21] Appl. No.: 09/073,927

[22] Filed: May 7, 1998

[30] Foreign Application Priority Data

May 9, 1997 [JP] Japan .................................... 9-134516

[51] Int. Cl.[7] ........................................................ G11B 7/00
[52] U.S. Cl. ............................... 369/58; 369/110; 369/112
[58] Field of Search .............................. 369/44.27, 44.37, 369/44.38, 94, 58, 110, 108, 44.23

[56] References Cited

U.S. PATENT DOCUMENTS

| | | | |
|---|---|---|---|
| 5,661,711 | 8/1997 | Tanaka et al. ........................... | 369/110 |
| 5,777,970 | 7/1998 | Kajiyama et al. ........................ | 369/94 |
| 5,793,734 | 8/1998 | Tsuchiya et al. ........................ | 369/94 |
| 5,875,167 | 2/1999 | Katayama ................................ | 369/94 |
| 5,910,937 | 6/1999 | Akiba et al. ............................. | 369/58 |

*Primary Examiner*—Thang V. Tran
*Attorney, Agent, or Firm*—Dickstein, Shapiro, Morin & Oshinsky

[57] ABSTRACT

An optical disk apparatus is described which can read information from and write information to optical disk of different thicknesses. The optical disk apparatus includes coupling lenses which alter the focusing capabilities of an objective lens which controls reading and writing to the optical disk. Thus, the present invention allows both "standard density" and "high density" optical disks to be accessed by the same optical disk apparatus.

19 Claims, 4 Drawing Sheets

OPTICAL DISK APPARATUS FOR ACCESSING OPTICAL DISKS WITH DIFFERENT SUBSTRATE THICKNESSES

BACKGROUND OF THE INVENTION

1. Field of the Invention

The present invention relates to an optical disk apparatus which can write information to and read information from respective optical disks with different substrate thicknesses through the use of a single objective lens.

2. Description of the Related Art

Conventional optical disk drives form a laser spot on a disk by focusing a laser ray and radiating a laser spot on a recording layer of a disk. The laser spot is used to access the disk during reading and writing operations. The conventional optical disk apparatus records information by forming marks (pits) in a recording layer of the optical disk. In order to read information from the disk, the disk drive detects a reflective laser ray from the recording layer and reproduces information based on the content of the reflected ray.

The recording layer in the above-described disk lies between two transparent plates made of a plastic material. Recently, a high recording density disk called Digital Video Disk (DVD) has been developed. A DVD "high density" recording media requires transparent plates which are thinner than the those used for "standard density" disks. In "standard density" disks, the transparent plates are approximately 1.2 mm thick, in DVD and other "high density" disks, the transparent plates are approximately 0.6 mm thick. Although DVD is not the only type of "high density" disk, the present invention will be described with reference to DVD.

With the continued development of the "high density" disk, it has become desirable to be able to record and reproduce information on disks which have different transparent substrate thicknesses.

To reproduce information recorded on the recording layer properly, the laser ray which is focused on the "standard density" disk laser has about a 1.2 $\mu$m diameter spot, and on the "high density" disk it is about a 1.0 $\mu$m diameter spot. However, when a laser ray with the same wave length is focused on respective disks with different transparent substrate thicknesses by the same objective lens, a proper laser spot cannot be formed on the recording layer. In that case, a spherical surface aberration occurs. The spherical surface aberration is a defocusing, or spreading out of the normal laser spot. This defocusing degrades the quality of the signal which is being read from or written to the optical disk. Thus, there is an incompatibility between the "standard density" disk and the "high density" disk in that a single objective lens cannot access information from both.

The spherical surface aberration is caused by the change in the thickness of the transparent substrate. Due to the change in thickness, the circumference of the laser ray radiated on the recording layer is defocused, and the circumference of the reflective ray becomes noisy. In other words, instead of forming a well-defined circular spot on the recording layer, the circumference of the spot becomes wider and less well-defined. Accordingly, the quality of the reproduced signal is degraded.

The present inventor has proposed an optical disk apparatus having an objective lens designed to reduce the spherical surface aberration when recording and reproducing on a "high density" disk with a thin transparent substrate. Traditionally, if one wants to use an objective lens suitable for a "high density" disk to record and reproduce a "standard density" disk, an aperture is required. The aperture is a filter placed in the optical path between the objective lens and the recording layer of the optical disk, which corrects the defocusing problem discussed above. The aperture narrows the amount of light that can pass through to the optical disk and therefore creates a more well-defined laser spot on the recording layer of the optical disk. The aperture in essence avoids the defocusing problem caused by the difference in substrate thickness.

However, when recording or reproducing a "high density" disk in the above example, the aperture is unnecessary. Therefore, it is necessary to provide for a mechanism for inserting and removing the aperture from the optical path when the disks are changed. The mechanism for inserting and removing the aperture must be highly accurate. A circuit and mechanism which would control the aperture changing accurately is costly and difficult to manufacture. Further, vibrations of the spindle motor and the sledge motor are transferred to the aperture changing mechanism, causing further defocusing of the laser spot. Therefore, it becomes increasingly difficult to read and write information accurately. Hence, it is currently undesirable to use an aperture changing mechanisms in optical disk drives.

SUMMARY OF THE INVENTION

It is therefore an object of the present invention to provide for an optical disk apparatus which can write information to and read information from an optical disk by using a single objective lens, without using an aperture, and without causing the above-mentioned problems associated with respective optical disks having different transparent substrate thicknesses.

In accordance with first embodiment of the present invention, an optical disk apparatus has a laser generator for recording and reproducing information with substrates of different thickness. The optical disk apparatus includes an objective lens for focusing a laser ray from the laser generator and forming a laser spot on the recording layer of the disk. The apparatus also includes photo detectors for receiving reflective light from the disk and for outputting a reproducing signal and servo signals (for controlling the focusing and tracking). The laser generator includes a first laser source and a second laser source, whose axes are at right angles to each other, which radiate waves for interaction with the optical disk. In the optical path between the two laser sources is a beam splitters for directing the signals to and from the first and second laser sources when recording and reproducing. Coupling lenses, located in an optical path between the beam splitters and the first laser source, and in an optical path between beam splitters and the second laser source, can be focused so that the laser spot formed by the objective lens will not cause a spherical surface aberration.

Further, in accordance with first embodiment of the present invention, one of the laser rays radiated from the first and second laser sources is P polarizing light, while the other is S polarizing light.

Additionally, in accordance with a first embodiment of the present invention, there is provided a power monitor for detecting power of the laser rays from the first laser source and the second laser source.

In accordance with second embodiment of the present invention, there is provided a $\lambda/2$ plate to change the polarizing condition of the laser ray passing through the optical path in which the plate is located. The plate is located either in the optical path between the first laser source and the beam splitters, or in the optical path between the second laser source and the beam splitters. The λ/2 plate changes the polarization condition of the laser ray propagating in the path in which the plate is located by 90 degrees.

In accordance with third embodiment of the present invention, the lengths of the optical paths, from the first laser source and the second laser source to the beam splitters are adjusted so as to further reduce a spherical surface aberration.

In accordance with a fourth embodiment of the present invention, there is provided a half mirror which is located between the objective lens and the beam splitters, for reflecting a laser ray reflected from the optical disk, and for splitting the optical path, so that a single photo detector can receive the laser ray reflected on the half mirror and output a reproducing signal and servo signals (for controlling focusing and tracking).

In accordance with fifth embodiment of the present invention, a photo detector has a first photo detector element for receiving the laser ray radiated from the first laser source and reflected from the disk, and a second photo detector element for receiving the laser ray radiated from the second laser source and reflected from the disk. There is also included a judging control means for judging substrate thickness of the disk based on the signals from the first photo detector element and the second photo detector element. The judging means performs a switching function, so as to close a circuit, connecting either the first photo detector or the second photo detector with a power source.

BRIEF DESCRIPTION OF THE DRAWINGS

FIG. 2 is a view showing second embodiment utilizing a λ/2 plate;

FIG. 5 is a view showing the structure of an optical disk apparatus according to a fifth embodiment, where the detection circuit is specially constructed;

DETAILED DESCRIPTION OF THE PREFERRED EMBODIMENTS

The preferred embodiments of the optical disk apparatus of the present invention will next be described in detail with reference to the accompanying drawings.

Figure 1:
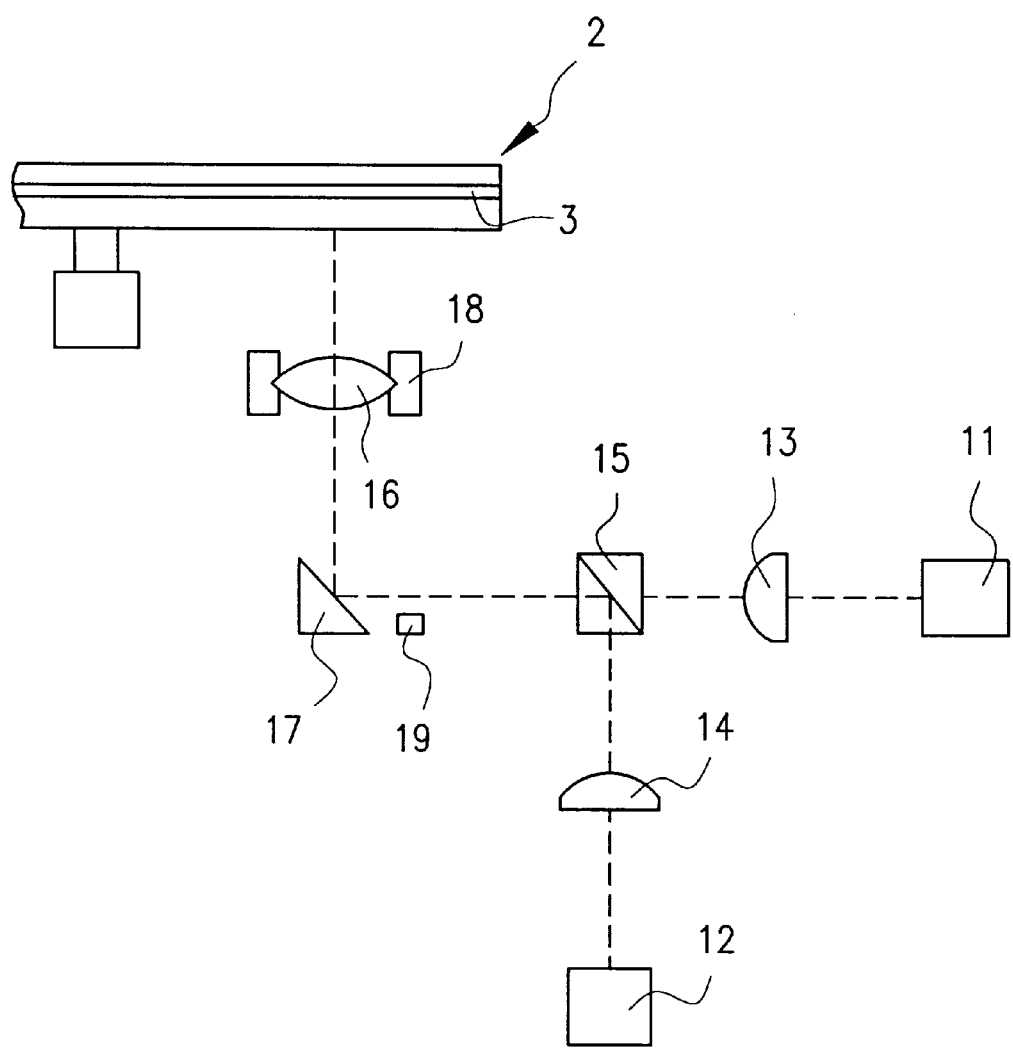
FIG. 1 is a view showing the structure of an optical disc apparatus according to a first embodiment.

FIG. 1 is a view showing the structural aspects of the optical disk apparatus in accordance with a first embodiment of the invention. The optical disk apparatus includes a first optical unit 11 and second optical unit 12, each including a laser source and photo detectors (not shown). The laser source is used when writing information to the optical disk, and both the laser source and the photo detectors are used when reading information from the disk. The apparatus also includes a first coupling lens 13 and second coupling lens 14 for changing the emission degree of the laser rays irradiated from the first optical unit 11 and the second optical unit 12, respectively. A beam splitter 15 is provided to pass the laser ray from the first optical unit 11 and deflect the laser ray from the second optical unit 12. A deflective prism 17 reflects the laser ray from the beam splitter 15 towards an objective lens 16. The objective lens 16 then forms a laser spot on the recording layer 3 of the disk 2 by focusing the incident laser ray. An actuator (also known as an automatic tracking control or ATC) 18 is provided for controlling the focusing and tracking functions of the objective lens 16. A front power monitor element 19 detects the laser power at a point between the objective lens 16 and the beam split means 15.

The wave length of the laser rays irradiated from the first optical unit 11 and the second optical unit 12 are different depending on the substrate thickness of the disk 2. The laser ray radiated from the first optical unit 11 is P polarized light, and the laser ray radiated from the second optical unit 12 is S polarized light. When recording or reproducing on a "high density" disk a laser ray (P polarized light) with a wave length of 650 nm is radiated from the first optical unit 11. When recording or reproducing on a "standard density" disk, a laser ray (S polarized light) with a wave length of 780 nm is radiated from the second optical unit 12.

When recording and reproducing for the "high density" disk, a laser ray is radiated from the first optical unit 11, is incident to the first coupling lens 13 and is focused, and then impinges onto the beam splitter 15. Then, because the laser ray is P polarized light, the laser ray is not deflected by the beam splitter 15, but is passed through to the prism 17 and objective lens 16, where it is focused on the recording layer 3 of the disk 2 as a laser spot. On the other hand, when recording and reproducing for the "standard density" disk, a laser ray is radiated from the second optical unit 12, is incident to the second coupling lens 14 and is focused, and then impinges onto the beam splitter 15. Then, because the laser ray is S polarized light, the laser ray is deflected by the beam splitter 15. The ray then travels to the prism 17 and objective lens 16, where it is focused on the recording layer 3 of the optical disk 2 as a laser spot.

When recording information, the laser ray radiated on the recording layer 3 has a predetermined optical intensity and is modulated in response to the information which is being recorded. Pits are formed in the disk 2 indicative of the recording information. Conversely, when reproducing information, the optical intensity of the laser ray radiated on the recording layer 3 is set to be lower than when information is being recorded. The reflective ray from the recording layer 3 follows the same optical path as when information is recorded, is received by the photo detectors included in the first and second optical units 11 (for the "standard density" disk) and 12 (for the "high density" disk), and is converted to an electric signal.

The actuator 18 controls the focusing and tracking functions of the objective lens 16 when information is being recorded and reproduced. When information is being read from the optical disk, the ray reflected from the recording layer 3 is fed to a photo detector (located in either the first 11 or second 12 optical sources), and a tracking error signal and a focusing error signal are detected by a respective detecting circuit. The actuator 18 is then controlled by the tracking error signal and the focusing error signal.

Because the optical intensity of the laser ray when recording and reproducing is different, the laser rays radiated from the first optical unit 11 and the second optical unit 12 need to be controlled. The laser rays from the first optical unit 11 and the second optical unit 12 are detected by a front power monitor element 19. Then, the power control of the laser rays is suitably controlled based on the received signals. Since the front power monitor element 19 is located between the objective lens 16 and the beam splitter 15, the laser power from the first optical unit 11 and the second optical unit 12 can be monitored by the single front power monitor element 19. Accordingly, by using a single power monitor to monitor both signals, the number of parts can be decreased, and the overall cost of the device can be reduced.

The operation of this embodiment will now be described. When the objective lens 16 focuses the laser ray from the first optical unit 11 (for reading or writing to a "high density" disk), the first coupling lens 13 corrects and changes the optical nature of the objective lens 16 so as not to produce a spherical surface aberrations and color aberrations. When the objective lens 16 focuses the laser ray from the second optical unit 12 (for reading or writing to a "standard density" disk), the second coupling lens 14 corrects and changes the optical nature of the objective lens 16 so as not to produce spherical surface aberrations and color aberrations. In this way, even when reproducing information on respective disks 2 with different substrate thicknesses by a single objective lens 16, spherical surface aberrations and color aberrations are eliminated.

In the above explanation, the optical nature of the objective lens 16 is corrected or changed by using the first coupling lens 13 and the second coupling lens 14. However, the invention may also be practiced with only a single coupling lens. When the objective lens 16 is designed for a certain type of disk 2 (e.g., the "high density" disk), it is needless to adjust the nature of the objective lens 16 by using the coupling lens for that type of disk. Accordingly, the apparatus needs only to correct or change the nature of the object lens 16 by using a coupling lens for the other type of disk 2 (e.g., the "standard density" disk ). Therefore, only one coupling lens is required. Hence, the overall size of the device is decreased, and the overall cost is reduced.

The second embodiment of the present invention will next be described. The same reference numerals are used to refer to the same elements as in the first embodiment.

In the first embodiment, the laser rays radiated from the first optical unit 11 are required to be P polarized light, and the laser rays radiated from the second optical unit 12 are required to be S polarized light. This means that two separate laser sources are required. The second embodiment shows an effective method for creating the polarization of these laser rays from a single source.

Figure 2A:
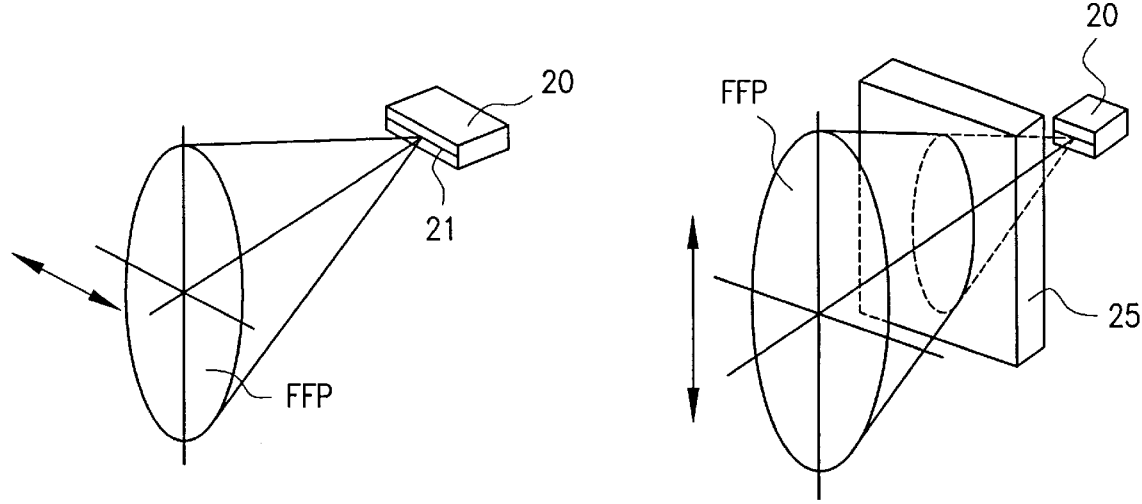
FIG. 2(a) shows a far field pattern from a laser diode.
Figure 2B:
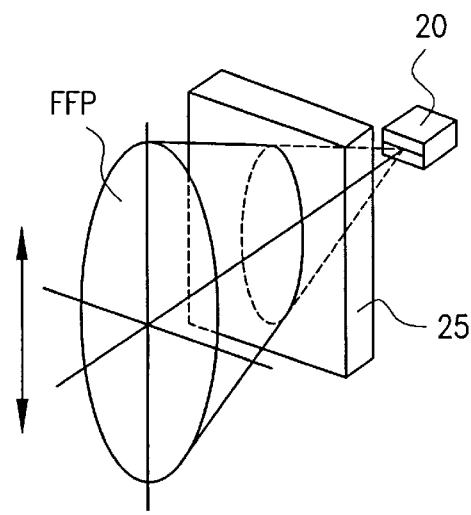
FIG. 2(b) shows a far field pattern from a laser diode altered by a λ/2 plate.
Figure 2C:
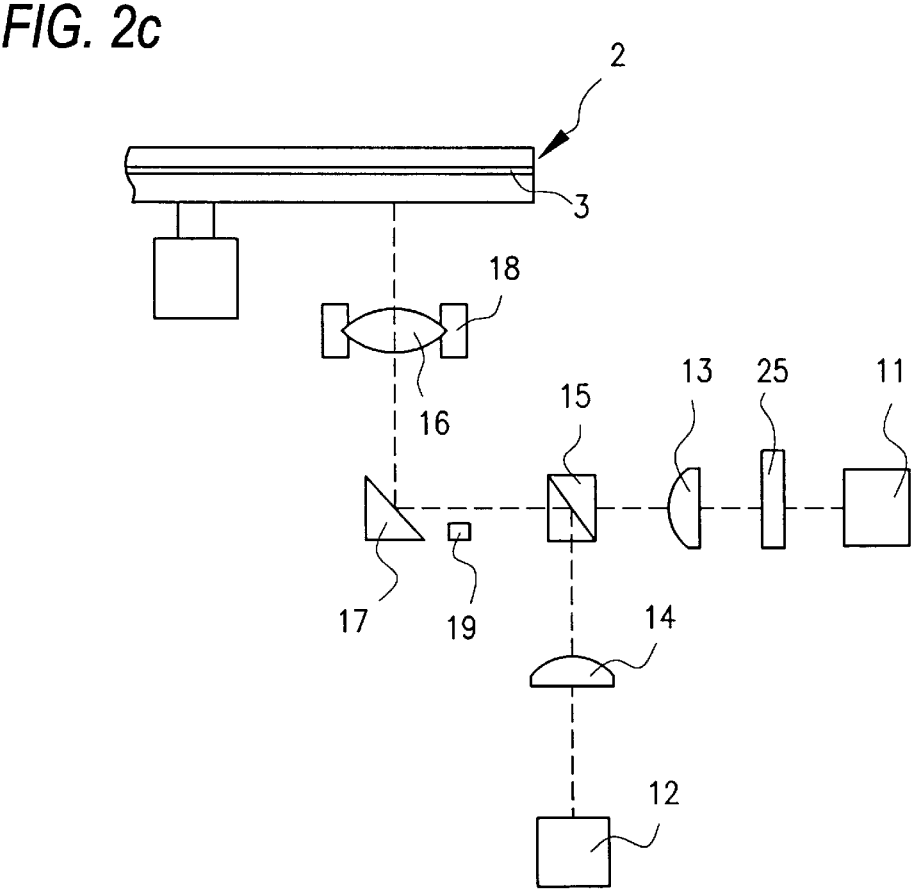
FIG. 2(c) shows an optical disk apparatus including a λ/2 plate.

In the second embodiment, there is provided for λ/2 plate 25 for achieving a polarizing condition. FIG. 2 shows the second embodiment in detail. FIG. 2(a) is a view showing the polarizing direction of the laser ray radiated from the laser diode 20, located within each of the first and second optical units 11 and 12. FIG. 2(b) is a view showing the condition when the polarizing direction of the laser ray is rotated by 90 degree by λ/2 plate 25. This plate is located either between the first optical unit 11 and the first coupling lens 13, or between the second optical unit 12 and the second coupling lens 14. FIG. 2(c) shows the λ/2 plate 25 located between the first optical unit 11 and the first coupling lens 13.

As shown in FIG. 2(a), the laser diode 20 has an active layer 21 formed as a plate, so that the far field pattern (FFP) of the radiated laser ray is elliptical and the polarizing direction is parallel to the active layer 21 as shown by the arrow. Namely, in FIG. 2(c), if the long axis direction of far field pattern in the laser ray radiated from the first optical unit 11 is in a vertical direction against the paper, the axis of far field pattern of the laser ray which impinges upon the coupling lens 13, and consequently the objective lens 16, is parallel to the paper.

In the "high density" disk, track pitch is small. Therefore, the long axis direction of far field pattern in the laser spot focused on by the objective lens 16 is preferred to be equal to the track direction. Accordingly, when changing the direction of the active layer 21 of the laser diode 20 for changing the polarizing direction, the long axis direction of the far field pattern in the laser spot does not agree with the track direction. In this way, as shown in FIG. 2(b), the optical axis of the λ/2 plate 25 is provided for being 45 degrees against the polarizing direction of the laser ray from the laser diode 20 and only polarizing direction is rotated by 90 degree without changing the long axis direction of far field pattern. The arrow in FIG. 2 (b) shows the polarizing direction after changing. Therefore, even if the polarizing directions of the laser rays radiating from the first optical unit 11 and the second optical unit 12 by such λ/2 plate are in the same direction (when they are radiated), the polarizing direction of one of the rays is altered from the other by 90 degrees by the λ/2 plate. Hence, it is possible to pass through the laser ray from the first optical unit 11 and deflect the laser ray from the second optical unit 12 when they reach the beam splitter 15.

Figure 3:
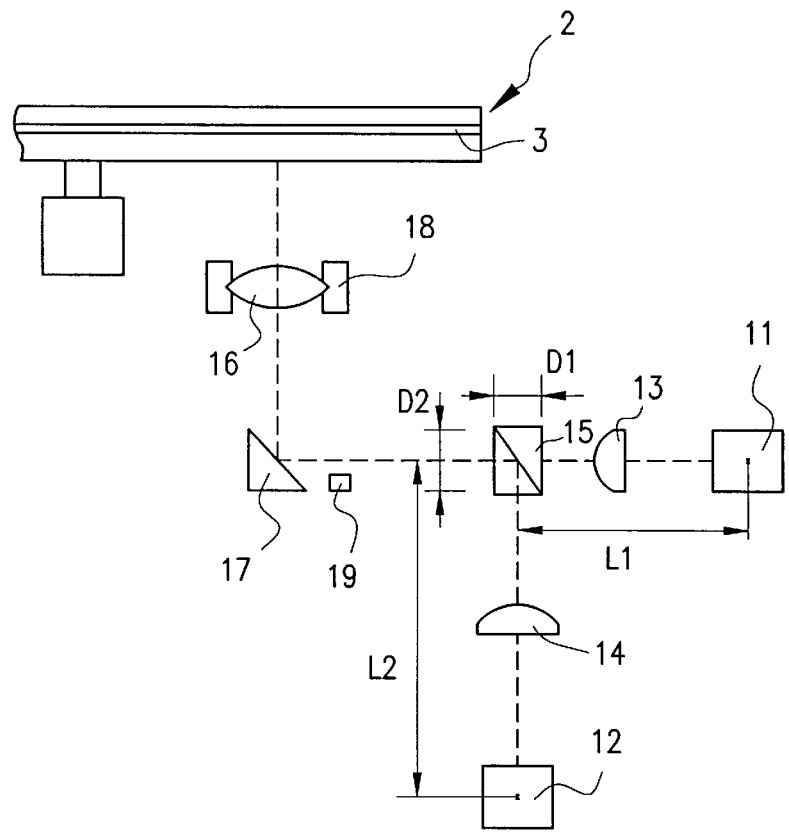
FIG. 3 is a view showing the structure of an optical disk apparatus according to a third embodiment, where the distances between the laser sources and the beam splitters are altered.

A third embodiment will now be explained referring to FIG. 3. The same reference numerals are used to refer to the same elements as in the first and second embodiments.

In the above mentioned first and second embodiments, the optical nature of the objective lens 16 is changed and corrected by the first coupling lens 13 and the second coupling lens 14, so as eliminate a spherical surface aberration when operating on disks with different substrate thicknesses. In the invention according to the third embodiment, as shown in FIG. 3, the optical lengths D1, D2 of the beam splitter 15, and the back focus distances L1, L2 are adjusted to further eliminate the spherical surface aberration. Therefore, it is possible to get the most suitable conjugate point between the objective lens 16 and the first 11 and second 12 optical sources. The, "X" mark shown in the first optical unit 11 and the second optical unit 12 shows the radiating point of the laser source.

Figure 4:
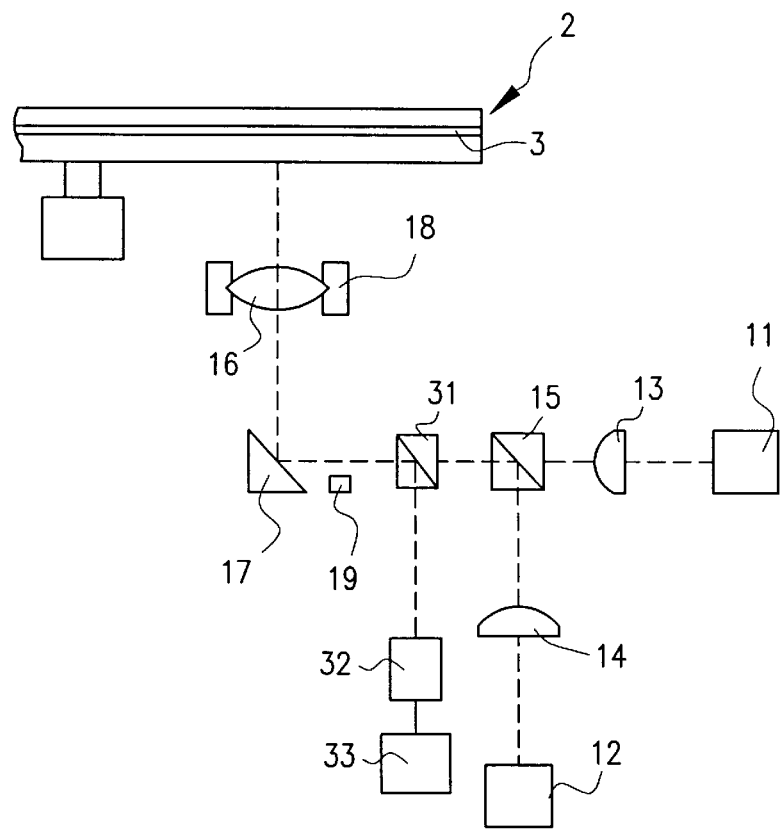
FIG. 4 is a view showing the structure of an optical disk apparatus according to a fourth embodiment, where a half mirror device is utilized.

A fourth embodiment of the invention is next explained referring to FIG. 4. The same reference numerals are used to refer to the same elements as in the first through third embodiments.

In all the above embodiments, separate photo detectors are provided for the first optical unit 11 and the second optical unit 12. In this embodiment, they become one part so as to reduce the number of parts. FIG. 4 is a view showing an optical arrangement in accordance with the fourth embodiment. This structure is essentially the same structure as the optical arrangement shown in the first embodiment. However, in this embodiment, a half mirror 31 is provided between the beam splitter means 15 and the deflective prism 17. Further, a photo detector 32 and a detecting circuit 33 are provided.

In this embodiment, a portion of the reflective light from the deflective prism 17 is reflected by the half mirror 31 and is incident upon the photo detector 32. After that, it is converted to an electric signal, and a reproducing signal and servo signals (for controlling focusing and tracking) are output from the detecting circuit 33. This single photo detector 32 and detecting circuit 33 combination is meant to take the place of the photo detectors and detecting circuits that were previously located inside the first 11 and second 12 optical sources. Accordingly, the first optical unit 11 and the second optical unit 12 do not require photo detectors and detecting circuits, and it is possible to reduce the number of parts and make the apparatus smaller.

A fifth embodiment of the invention is next explained referring to FIG. 5. The same reference numerals are used to refer to the same elements as in the first through fourth embodiments.

In this embodiment, photo detectors 41, 42 are provided in the first optical unit 11 and the second optical unit 12, respectively. The reflective light from the disk is detected by the photo detectors 41, 42 and converted to an electric signal. Then, the electric signal is fed to a single detecting circuit 43 in order to detect a reproducing signal and servo signals (for controlling focusing and tracking).

Figure 5A:
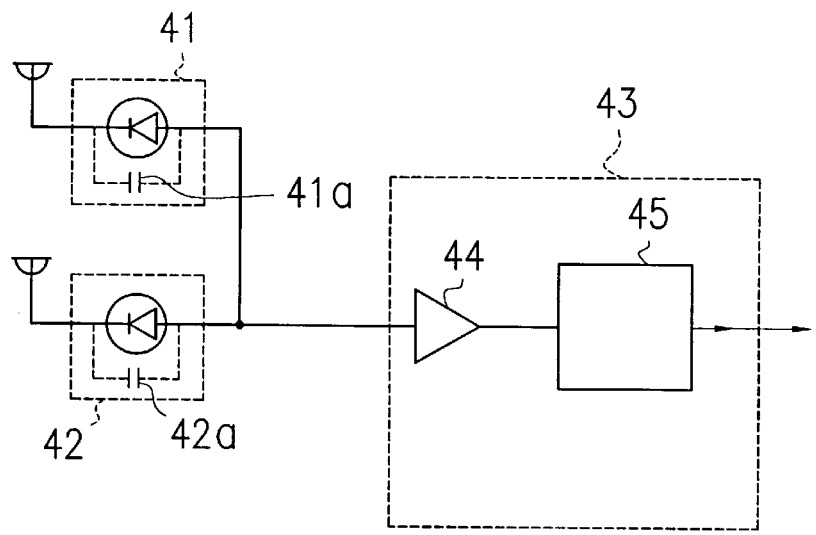
FIG. 5(a) shows a detection circuit which has two different photo detectors as inputs.

As stated above, the first optical unit 11 and the second optical unit 12 can not operate at the same time since each is suited for a particular type of optical disk. Unit 11 operates when accessing a "standard density" disk, and unit 12 operates when accessing a "high density" disk. In order to reduce the number of parts, as shown in FIG. 5(a), the detecting circuit 43 is used commonly and receives inputs from both the photo detector 41 (located in optical unit 11) and the photo detector 42 (located in optical unit 12). The detecting circuit 43 comprises an amplifier 44 to amplify the received signals, and an operating circuit 45 which outputs a reproducing signal and servo signals based on the received signal. In this particular example, power is always supplied to photo detectors 41 and 42. Therefore, when the photo detector 41 receives the reflective light and photo detector 42 receives dispersive light, the electric signal from the photo detector 42 is mixed in with the electric signal from the photo detector 41 and both are input to the amplifier 44. Then, because the electric signal from the photo detector 42 is noisy (because of defocusing), the quality of the signal input to the operating circuit 45 is reduced and consequently the reliability of the reproducing signal and servo signals is reduced.

Figure 5B:
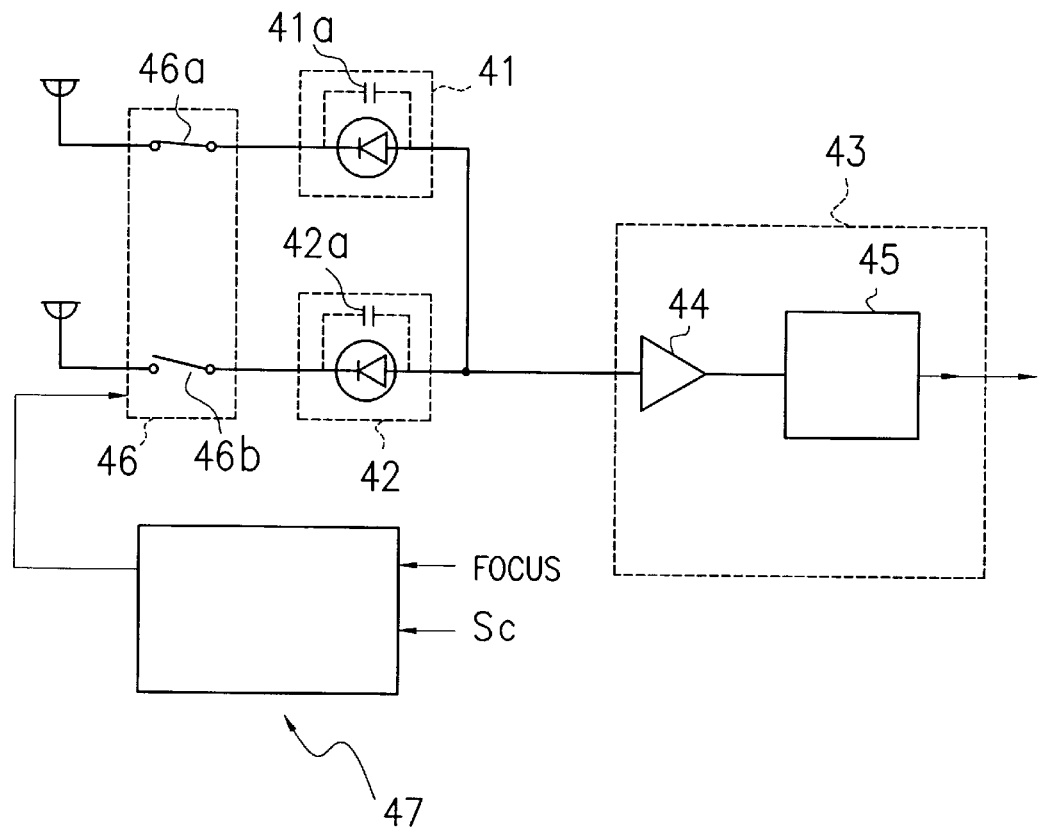
FIG. 5(b) shows a detection circuit similar to FIG. 5(a), except that there is further included a judging circuit for opening and closing switch contacts connected to the photo detectors.

The photo detectors 41 and 42 have capacity C, like PN join capacity. In FIG. 5(a), equivalent condensers 41a, 42a showing capacity C are shown by a dotted line. Accordingly, since the photo detectors 41,42 are always connected with the power source, these condensers 41a, 42a are connected in parallel with the power source, and the response speed of the photo detectors 41, 42 is decreased. To remedy this problem, as shown in FIG. 5(b), there is provided a switch circuit 46 so that the unused photo detector may be disconnected from the power source. This circuit also serves to filter out the noisy signal discussed above. Therefore, it is possible to protect the quality reproducing and servo signals while at the same time increasing the response speed of the circuit.

The operation of the switching circuit shown in FIG. 5(b) will next be described. The switch circuit 46 has a first switch 46a, a second switch 46b, and a judging circuit 47 to judge whether the disk 2 is the "standard density" disk (with the thick substrate) or the "high density" disk (with the thin substrate). Based on this judgment, the first switch 46a and the second switch 46b are controlled. Many different methods may be employed to control the judging circuit 47. For example, by comparing the amplitude value of a focus signal with a predetermined value, it is possible to judge what type of disk 2 is inserted in the optical disk apparatus. Namely, when varying from the "standard density" disk to the "high density" disk, because of difference in substrate thickness, if the objective lens 16 had previously focused on the "standard density" disk, it will not then be able to focus on the "high density" disk. As the result, the amplitude value of the focus signal is decreased. The same situation occurs when changing the from the "high density" disk to the "standard density" disk.

A judging circuit 47 for accomplishing this function is shown in FIG. 5(b). If the difference between the amplitude value of the focus signal before changing the disk 2 and the amplitude value of the focus signal after changing the disk 2 is a standard value Sc, when the amplitude value of the focus signal is smaller than the standard value Sc, it can be judged that the disk 2 has been changed. For example, if the "standard density" disk is read currently, the first switch 46a is off and the second switch 46b is on. This is because the second switch 46b controls the second photo detector 42, which is housed in optical unit 12, which is used for reading "standard density" disks. Then, at some later point, the "standard density" disk is exchanged for a "high density" disk. When this occurs, the objective lens 16 becomes defocused, because of the different substrate thickness. Therefore, the amplitude value of the focus signal is smaller than the standard value Sc. At this point, the judging circuit judges that a disk of different thickness has been inserted into the optical disk apparatus, and switches switch 46a on and switch 46b off. Switches 46a and 46b are operated alternately so that both can never be on at the same time. By controlling the switches in this way, the noise created by the defocused signal will not be mixed into the detecting circuit 43, and the response speed is increased due to the elimination of the capacitance of one of the switches.

As mentioned above, in accordance with the first embodiment, there is provided a coupling lens for correcting or changing the nature of the objective lens either between an optical path containing the beam splitter and the first laser source, or the optical path containing the beam splitter and the second laser source. Therefore, it is possible to focus on disks with different thickness without causing a spherical surface aberration.

Further, in accordance with the first embodiment, there is provided for a power monitor element for detecting power of a laser ray in the optical path between the beam splitters and the objective lens. Therefore, it is possible to monitor the laser power from the first and second laser sources using a single power monitor. Hence, the number of parts in the optical disk apparatus can be reduced, the apparatus can be miniaturized, and the cost of the device can be reduced.

Additionally, in accordance with the first embodiment, the polarizing direction of the laser ray from the first laser source is P polarizing light, and the polarizing direction of the laser ray from the second laser source is S polarizing light. Therefore, because of the difference in conditions of the polarizing light, it is possible to split and compose the laser source signals easily through use of the beam splitters.

In accordance with the second embodiment, a $\lambda/2$ plate is provided to change the condition of the polarizing light of the laser ray between the first laser source or the second laser source and the beam splitter. Therefore, it is possible to change both the condition of the polarizing light of the laser ray from the first laser source and the condition of the polarizing light of the laser ray from the second laser source by 90 degrees. Accordingly, because of the difference in conditions of the polarizing light, it is possible to split and compose the laser source signals easily through use of the beam splitter.

In accordance with the third embodiment, the lengths of the optical paths from the first laser source and the second laser source, to the beam splitter, are adjusted. Therefore, the laser ray can be focused on disks with different thickness without causing a spherical surface aberration.

In accordance with a fourth embodiment, a half mirror, for splitting the reflective light from the disk, is located between the objective lens and the beam splitter. Then, a reproducing signal is created by receiving the reflective light. Therefore, since there is only one photo detector, it is possible to reduce the number of parts in the optical disk apparatus, to miniaturize the apparatus, and to reduce the cost.

In accordance with a fifth embodiment, there is provided a judging control means which operates to connect either a first photo detector or a second photo detector with a power source by judging the substrate thickness of the disk. Therefore, even when a single detecting circuit is used commonly for two photo detectors, there is no noise mixed in with the received signal. Further, the judging means increases the response speed of the detecting circuit.

What is claimed is:

1. An optical disk apparatus comprising:
   a laser generator for radiating laser rays for reading information from and writing, information to optical disks with different substrate thicknesses, said laser generator including a first laser source and a second laser source whose axes are at right angles to each other;
   an objective lens for focusing the laser rays from the laser generator and forming a laser spot on a recording layer of the optical disk;
   at least one photo detector for receiving reflective light from the optical disk and for outputting a reproducing signal and servo signals;
   a beam splitter located in an optical path between the first laser source and the second laser source; and,
   at least one coupling lens located either in an optical path between the beam splitter and the first laser source, or in an optical path between the beam splitter and the second laser source, the coupling lens allowing the objective lens to focus on optical disks of different substrate thickness without causing a spherical surface aberration; and
   wherein the at least one photo detector further comprises:
      a first photo detector element for receiving a laser ray radiated from the first laser source and reflected from the optical disk;
      a second photo detector element for receiving a laser ray radiated from the second laser source and reflected from the optical disk; and,
      a judging control circuit for judging substrate thickness of the optical disk based on signals from the first photo detector element and the second photo detector element, and for connecting either the first photo detector or the second photo detector with a power source in accordance with an output from said judging control circuit.

2. An optical disk apparatus comprising:
   a laser generator for radiating laser rays for reading information from and writing information to optical disks with different substrate thicknesses, said laser generator including a first laser source and a second laser source whose axes are at right angles to each other;
   an objective lens for focusing the laser rays from the laser generator and forming a laser spot on a recording layer of the optical disk;
   at least one photo detector for receiving reflective light from the optical disk and for outputting a reproducing signal and servo signals;
   a beam splitter located in an optical path between the first laser source and the second laser source; and,
   at least one coupling lens located either in an optical path between the beam splitter and the first laser source, or in an optical path between the beam splitter and the second laser source, the coupling lens allowing the objective lens to focus on optical disks of different substrate thickness without causing a spherical surface aberration,
   wherein the lengths of the optical paths from the first laser source and the second laser source to the beam splitter are adjusted, so that the objective lens can be focused on a recording layer of the optical disk without causing a spherical surface aberration; and,
   wherein the at least one photo detector further comprises:
      a first photo detector element for receiving a laser ray radiated from the first laser source and reflected from the optical disk;
      a second photo detector element for receiving a laser ray radiated from the second laser source and reflected from the optical disk; and,
      a judging control circuit for judging substrate thickness of the optical disk based on signals from the first photo detector element and the second photo detector element, and for connecting either the first photo detector or the second photo detector with a power source in accordance with an output from said judging control circuit.

3. The optical disk apparatus of claim 1, wherein laser rays radiated from one of the first laser source and the second laser source are P polarizing light rays, and laser rays radiated from the other are S polarizing light rays.

4. The optical disk apparatus of claim 2, wherein laser rays radiated from one of the first laser source and the second laser source are P polarizing light rays, and laser rays radiated from the other are S polarizing light rays.

5. The optical disk apparatus of claims 1, further comprising:
   a $\lambda/2$ plate for changing the polarizing direction of a laser ray passing through the optical path either between the first laser source and the beam splitter or passing through the optical path between the second laser source and the beam splitter,
   wherein the polarizing direction of the ray passing through said $\lambda/2$ plate is changed by 90 degrees.

6. The optical disk apparatus of claims 2, further comprising:
   a $\lambda/2$ plate for changing the polarizing direction of a laser ray passing through the optical path either between the first laser source and the beam splitter or passing through the optical path between the second laser source and the beam splitter,
   wherein the polarizing direction of the ray passing through said $\lambda/2$ plate is changed by 90 degrees.

7. The optical disk apparatus of claim 1, further comprising:

a power monitor for detecting the power of laser rays radiated from both the first laser source and the second laser source.

8. The optical disk apparatus of claim 2, further comprising:

a power monitor for detecting the power of laser rays radiated from both the first laser source and the second laser source.

9. The optical disk apparatus of claim 1, further comprising:

a half mirror located between the objective lens and beam splitters, for reflecting the laser ray reflected from the optical disk, wherein the at least one photo detector receives the laser ray reflected by the half mirror and outputs a reproducing signal and servo signals.

10. The optical disk apparatus of claim 2, further comprising:

a half mirror located between the objective lens and beam splitters, for reflecting the laser ray reflected from the optical disk, wherein the at least one photo detector receives the laser ray reflected by the half mirror and outputs a reproducing signal and servo signals.

11. An optical disk apparatus for reading information from and writing information to optical disks with different substrate thicknesses, comprising:

a first photo detector element for receiving a laser ray radiated from a first laser source and reflected from an optical disk;

a second photo detector element for receiving a laser ray radiated from a second laser source and reflected from the optical disk; and, a judging control circuit for judging substrate thickness of the optical disk based on signals from the first photo detector element and the second photo detector element, and for connecting either the first photo detector or the second photo detector with a power source in accordance with an output from said judging control circuit.

12. An optical disk apparatus for reading information from and writing information to optical disks with different substrate thicknesses, comprising:

a first photo detector element for receiving a laser ray radiated from a first laser source and reflected from an optical disk;

a second photo detector element for receiving a laser ray radiated from a second laser source and reflected from the optical disk; and, a judging control circuit for judging substrate thickness of the optical disk based on signals from the first photo detector element and the second photo detector element, and for connecting either the first photo detector or the second photo detector with a power source in accordance with an output from said judging control circuit;

wherein the lengths of the optical paths from the first laser source and the second laser source to a beam splitter are adjusted so that an objective lens can be focused on a recording layer of the optical disk without causing a spherical surface aberration.

13. A method of accessing a recording layer of an optical disk comprising the steps of:

providing first and second laser sources located in first and second perpendicular optical paths; providing a beam splitter located at the intersection of the first and second optical paths;

providing at least one coupling lens in either the first or second optical path which reduces a spherical surface aberration;

providing an objective lens which focuses a laser ray emitted from said beam splitter on a recording layer of an optical disk;

providing a first photo detector element for receiving a laser ray radiated from the first laser source and reflected from the optical disk;

providing a second photo detector element for receiving a laser ray radiated from the second laser source and reflected from the optical disk;

providing a judging control circuit which judges a substrate thickness of the optical disk based on signals from the first photo detector element and the second photo detector element, and which connects either the first photo detector or the second photo detector with a power source in accordance with an output from said judging control circuit; and, reading or writing information to the recording layer of the optical disk through the focused laser ray.

14. The method of claim 13, wherein the lengths of the optical paths from the first laser source and the second laser source to the beam splitters are adjusted, in order to reduce a spherical surface aberration.

15. The method of claim 13, further comprising the step of:

providing a $\lambda/2$ plate for changing the polarization direction of a laser ray radiated from one of the first or second laser sources by 90 degrees.

16. The method of claim 13, wherein one of the laser sources provides a P polarized light ray and the other provides an S polarized light ray.

17. The method of claim 13, further comprising the step of:

providing a power monitor for detecting power of laser rays radiated from both the first laser source and the second laser source.

18. The method of claim 13, further comprising the step of:

providing a half mirror located in an optical path between the objective lens and beam splitter, for further reflecting a laser ray reflected from the optical disk; and providing at least one photo detector, wherein the at least one photo detector receives the laser ray reflected on the half mirror and outputs a reproducing signal and servo signals.

19. A method of accessing a recording layer of an optical disk comprising the steps of:

providing a first photo detector element for receiving a laser ray radiated from a first laser source and reflected from the optical disk;

providing a second photo detector element for receiving a laser ray radiated from a second laser source and reflected from the optical disk;

providing a judging control circuit which judges a substrate thickness of the optical disk based on signals from the first photo detector element and the second photo detector element, and which connects either the first photo detector or the second photo detector with a power source in accordance with an output from said judging control circuit; and, reading or writing information to the recording layer of the optical disk through a focused laser ray.

\* \* \* \* \*